United States Patent
Hirsch et al.

(10) Patent No.: US 11,135,999 B2
(45) Date of Patent: Oct. 5, 2021

(54) BELT RETRACTOR FOR A VEHICLE SAFETY BELT

(71) Applicant: TRW AUTOMOTIVE GMBH, Alfdorf (DE)

(72) Inventors: Johann Hirsch, Alfdorf (DE); Jürgen Rink, Waldstetten (DE); Friedrich Littau, Rienharz (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 242 days.

(21) Appl. No.: 16/307,159

(22) PCT Filed: May 31, 2017

(86) PCT No.: PCT/EP2017/063078
§ 371 (c)(1),
(2) Date: Dec. 5, 2018

(87) PCT Pub. No.: WO2017/211624
PCT Pub. Date: Dec. 14, 2017

(65) Prior Publication Data
US 2019/0143933 A1    May 16, 2019

(30) Foreign Application Priority Data
Jun. 6, 2016 (DE) .................... 10 2016 006 750.0

(51) Int. Cl.
*B60R 22/38* (2006.01)
*B60R 22/405* (2006.01)

(52) U.S. Cl.
CPC ............ *B60R 22/38* (2013.01); *B60R 22/405* (2013.01)

(58) Field of Classification Search
CPC ....... B60R 22/38; B60R 22/40; B60R 22/405; B60R 2022/385
See application file for complete search history.

(56) References Cited

U.S. PATENT DOCUMENTS

| | | | |
|---|---|---|---|
| 3,248,069 A | | 4/1966 | Nichols et al. |
| 5,375,787 A | * | 12/1994 | Fujimura .............. B60R 22/405 242/384.5 |
| 2009/0057469 A1 | | 3/2009 | Choi et al. |
| 2011/0290930 A1 | * | 12/2011 | Tatsuma .................. B60R 22/38 242/383.2 |

(Continued)

FOREIGN PATENT DOCUMENTS

| | | |
|---|---|---|
| CN | 202089022 | 12/2011 |
| DE | 1260992 | 2/1968 |

(Continued)

*Primary Examiner* — Sang K Kim
(74) *Attorney, Agent, or Firm* — Tarolli, Sundheim, Covell & Tummino LLP

(57) ABSTRACT

The invention relates to a belt retractor (5) for a vehicle seat belt system, comprising a frame (10), a belt reel (14) which is rotatably arranged within the frame (10), and a locking system which can lock the belt reel in a webbing-sensitive manner, wherein the locking system includes an inertia pawl (30) which per se co-rotates with the belt reel (14) and is pivotable from a home position in which the belt reel is freely rotatable about a pivot axis (S) to a locking position, characterized in that a means to trigger pivoting of the inertia pawl (30) is provided which is responsive to exceeding a predetermined centrifugal force.

5 Claims, 4 Drawing Sheets

(56) References Cited

U.S. PATENT DOCUMENTS

2013/0181430 A1* 7/2013 Bosse .................. B60R 22/341
                                                  280/807
2016/0031412 A1   2/2016 Rink et al.

FOREIGN PATENT DOCUMENTS

DE      1506108      6/1969
DE      2318957     10/1974
DE      3636073      4/1988

* cited by examiner

BELT RETRACTOR FOR A VEHICLE SAFETY BELT

RELATED APPLICATIONS

This application corresponds to PCT/EP2017/063078, filed May 31, 2017, which claims the benefit of German Application No. 10 2016 006 750.0, filed Jun. 6, 2016, the subject matter of which are incorporated herein by reference in their entirety.

BACKGROUND OF THE INVENTION

The invention relates to a belt retractor for a vehicle seat belt system comprising a frame, a belt reel which is rotatably disposed in the frame and a locking system which can lock the belt reel in a webbing-sensitive manner, wherein the locking system has an inertia pawl which per se co-rotates with the belt reel and is pivotable from a home position in which the belt reel is freely rotatable about a pivot axis to a locking position.

A seat belt for a vehicle occupant to belt up is received on the belt reel. In the normal condition, the belt reel is freely rotatable against the action of a return spring in a webbing extension direction. Thus, the vehicle occupant may extend the seat belt, for example in order to belt up or to lean forward in the belted condition. When the seat belt is released, for example when the vehicle occupant unfastens the seat belt or leans backward again, it is wound onto the belt reel again by the action of the return spring.

It is generally known that the belt reel of said belt retractor may be blocked in two different ways: in a vehicle-sensitive manner and in a webbing-sensitive manner. Vehicle-sensitive blocking is triggered depending on parameters relating to the vehicle, for example the deceleration of the vehicle. Webbing-sensitive blocking is triggered depending on parameters relating to the belt webbing and, resp., the seat belt, for example the acceleration at which webbing is unwound from the belt retractor.

When the vehicle in which the belt retractor is arranged accordingly is strongly decelerated and/or the webbing is unwound from the belt retractor at the proper acceleration, the blocking of the belt reel is triggered. In this condition (almost) no more webbing can be unwound. The limited extension of belt webbing which is possible due to the film reel effect or due to an optionally present belt force limiter is neglected in this context.

Within the scope of the invention, merely the webbing-sensitive blocking is considered. Said blocking is triggered by means of the inertia pawl. The inertia pawl is arranged on the belt reel or a component connected to the latter so that it co-rotates with the belt reel. The inertia pawl is pivoted in its center of mass and it is pressurized into the home position by a return spring.

The inertia pawl is disposed within locking teeth surrounding the inertia pawl in ring shape and being part of a locking ring that can be rotated relative to the frame from a home position to a blocking position. When the locking ring is rotated to the blocking position, the belt reel is blocked.

In its home position, the inertia pawl can be freely rotated inside the locking teeth so that the belt reel, too, can be freely rotated.

When the belt webbing is unwound from the belt reel at an increasing velocity, this leads to angular acceleration of the belt reel. As long as the angular acceleration is below a trigger threshold of the webbing-sensitive blocking, the inertia pawl is retained in its home position due to the action of the return spring.

If the angular acceleration exceeds the trigger threshold, this results in the inertia pawl rotating relative to the belt reel due to its mass inertia, thus causing the tip of the inertia pawl to engage in the locking teeth. In this way, rotation of the belt reel is transmitted to the locking teeth and thus to the locking ring which is thus rotated into the blocking position. Then the belt reel is blocked.

SUMMARY OF THE INVENTION

It is the object of the invention to improve the known locking mechanism.

For achieving this object, a means for triggering pivoting of the inertia pawl which is responsive to exceeding a predetermined centrifugal force is provided in a belt retractor of the type mentioned in the beginning. The locking mechanism of said belt retractor is not only responsive to an angular acceleration of the belt reel but also to the rotational speed. This prevents the belt reel from reaching any excessively high rotational speeds before the locking mechanism blocks the belt reel.

According to a preferred embodiment of the invention, the means is provided to be a space between the pivot axis of the inertia pawl and the center of mass thereof. In other words, the inertia pawl is eccentrically supported so that in particular conditions a torque acting about the pivot axis can be produced.

Preferably, the space is provided to extend in a direction which is different from a radius extending through the pivot axis and the axis of rotation of the belt reel. In said arrangement of the center of mass relative to the pivot axis, the centrifugal force acting in the center of mass produces a torque that attempts to rotate the inertia pawl about the pivot axis.

When the center of gravity of the inertia pawl extends between a radius extending through the pivot axis and a radius extending through the axis of rotation of the belt reel and an inertia pawl tip associated with locking teeth of the locking system, the inertia pawl is ensured to be swiveled to the locking position as soon as the centrifugal forces become so high that the action of the return spring is overcome.

Of preference, the space extends approximately normal to the radius extending through the pivot axis. In this configuration, a maximum torque is produced by an as short space as possible between the center of mass of the inertia pawl and its center of gravity.

For the space between the center of mass of the inertia pawl and its pivot axis values within the order of magnitude of from 0.5 mm to 2 mm are suitable. Especially preferred are values within the order of magnitude of from 0.7 to 1.0 mm.

According to another preferred embodiment of the invention, the means is provided to be a pivoted lever which is arranged on the outside of the inertia pawl and can contact locking teeth of the locking system. The point of contact between the pivoted lever and the locking teeth acts as a counter-bearing so that the pivoted lever "lifts" the inertia pawl out of the home position into the locking position at a rotational speed adjustable by design, even if the inertia pawl continues being supported in its center of mass. Nevertheless, if desired, even in this embodiment a space may be provided between the center of mass of the inertia pawl and its pivot axis in the same way as in the first embodiment.

According to one configuration, the pivoted lever is attached by one end to the inertia pawl while at the other end it has a leverage mass. This helps to maximize the action exerted by the leverage mass on the inertia pawl in the case of centrifugal forces. The magnitude of the leverage mass helps to adjust the rotational speed at which the pivoted lever moves the inertia pawl into the locking position.

Of preference, the pivoted lever is connected to the inertia pawl at the end thereof facing away from an inertia pawl tip. This results in the inertia pawl being pressed from the home position to the locking position, when the leverage mass is pressed outwards by an acting centrifugal force and the pivoted lever bears against the locking teeth.

According to one configuration, the pivoted lever is a leaf spring made from metal. This allows to produce high reset force for the leverage mass.

According to an alternative configuration, the pivoted lever is formed integrally with the inertia pawl. Thus, a separate mounting step is dropped.

BRIEF DESCRIPTION OF THE DRAWINGS

Hereinafter, the invention will be described by way of two embodiments shown in the enclosed drawings, wherein.

DESCRIPTION

Figure 1:
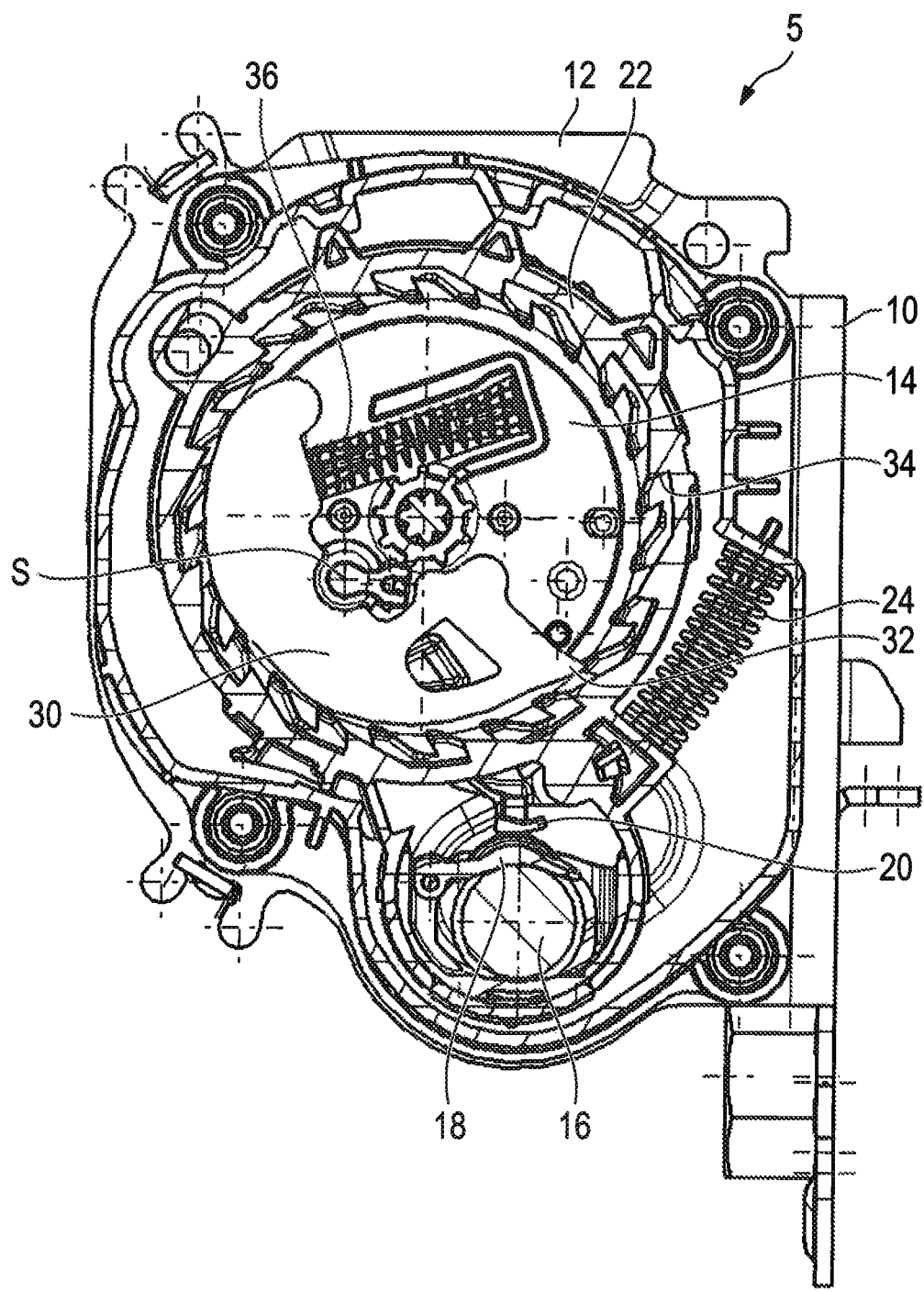
FIG. 1 shows, in a side view, a belt retractor according to the invention as set forth in a first embodiment.

In FIG. 1 a belt retractor 5 is depicted which may be used as part of a vehicle occupant restraint system especially in automotive vehicles.

The belt retractor includes a frame 10 which serves for being attached in a vehicle. Between two legs 12 of the frame, only one of which is visible in FIG. 1, a belt reel 14 is rotatably arranged. Only a side flange or a component connected to the belt reel is shown of the belt reel 14 here.

The belt reel is supported in a manner known per se within the frame 10 to be rotatable so that in the normal condition it is freely rotatable, thus allowing a seat belt received on the same to be unwound. In order to wind up the seat belt onto the belt reel again, a return spring (not evident here) is provided.

The belt retractor is further provided with a blocking system by which the belt reel can be blocked in the case of need. Triggering may be webbing-sensitive or vehicle-sensitive, as described in detail in the beginning.

The essential part of the vehicle-sensitive blocking system evident here is an inertia mass 16 and various locking levers 18, 20.

In order to trigger vehicle-sensitive blocking, the inertia mass 16 must be moved out of a home position. In this way, the locking levers 18, 20 are moved so that the belt reel 14 is coupled to a locking ring 22. The locking ring 22 is attached to the frame 10 to be rotatable about a predetermined angle. When it is entrained against the action of a spring 24 out of its home position by rotation of the belt reel 14, this will result in blocking of the belt reel. This is generally known and shall not be explained in detail here.

The locking ring 22 is also used to effectuate webbing-sensitive blocking of the belt reel 14. A substantial part of the mechanism for webbing-sensitive blocking is an inertia pawl 30 which is pivoted to the belt reel 14 and, resp., to the component connected to the belt reel 14 about a pivot axis S. The inertia pawl 30 at one end includes an inertia pawl tip 32 adapted to engage in locking teeth 34 which are provided on the inside of the locking ring 22.

A return spring 36 pressurizing the inertia pawl 30 into the home position shown in FIG. 1 is associated with the inertia pawl 30. In said home position, the outermost point of the inertia pawl tip 32 is located on a smaller radius than the innermost point of the locking teeth 34 so that the inertia pawl 30 and along with the latter the belt reel 14 can be freely rotated.

When, however, the inertia pawl 30 is pivoted clockwise from its home position shown in FIG. 1 to a locking position, the inertia pawl tip 32 engages in the locking teeth 34 so that the belt reel 14 is coupled to the locking ring 22 via the inertia pawl 30. In this case, too, rotation of the belt reel 14 results in the locking ring 22 being entrained against the action of the spring 24, which results in blocking of the belt reel 14.

In conventional belt retractors the inertia pawl 30 is supported in its center of mass. Thus, the absolute speed of the belt reel has no influence on the locking behavior of the inertia pawl 30; it is solely the amount of angular acceleration of the belt reel which decides whether from the mass inertia moment of the inertia pawl a torque is resulting by the action of which the force of the return spring 36 can be overcome.

Figure 2:
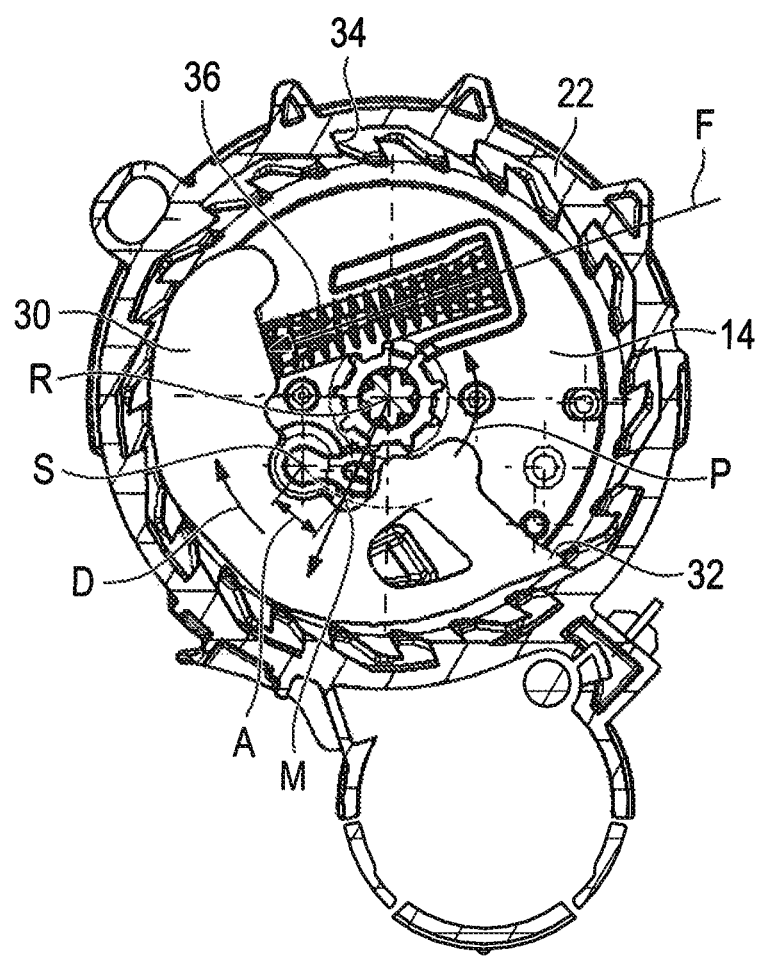
FIG. 2 shows a further diagrammatic view corresponding to FIG. 1.

In accordance with the invention, it is provided, however, that the center of mass M of the inertia pawl 30 is offset relative to the pivot axis S, namely by a space A (cf. FIG. 2). The space A is located approximately normal to a radius extending through the axis of rotation R of the belt reel 14 and the pivot axis S of the inertia pawl 30.

When the belt reel and thus the inertia pawl 30 are rotated in the direction of the arrow P, a torque D resulting from the mass inertia of the inertia pawl 30 acting against the force F of the return spring 36 is resulting, it said rotation is accelerated. In addition, the centrifugal force acting in the center of mass M of the inertia pawl 30 produces a torque about the pivot axis S which is composed of the centrifugal force and the lever arm A. Said torque acts in the same direction as the torque which, in the case of angular acceleration of the belt reel, acts during webbing extension.

It follows herefrom that two parameters are decisive to move the inertia pawl 30 from its home position to the locking position. Initially, the case may be considered that the belt reel 14 is rotated at strong angular acceleration while the absolute speed continues being relatively low. In this case (almost exclusively) the angular acceleration is crucial to the fact that the inertia pawl 30 triggers the blocking.

There may also be considered the case that the belt reel is rotated at comparatively low angular acceleration, but the absolute speed gradually reaches a considerable amount. In this case, it is (almost exclusively) the centrifugal force acting on the inertia pawl 30 which ensures the force of the return spring 36 to be overcome.

Finally, mixed conditions are possible in which the combination of the centrifugal force acting at a particular speed and the mass inertia moment counteracting angular acceleration leads to the fact that the torque D altogether acting on the inertia pawl 30 can overcome the force F of the return spring 36.

In this embodiment, a particular influence of gravity is given to the effect that depending on the position of the inertia pawl the center of mass M produces a torque counteracting force F or assisting force F. However, said influence is negligible vis-à-vis the effects of high angular acceleration and high speed so that this will not be further taken into consideration here.

Figure 3:
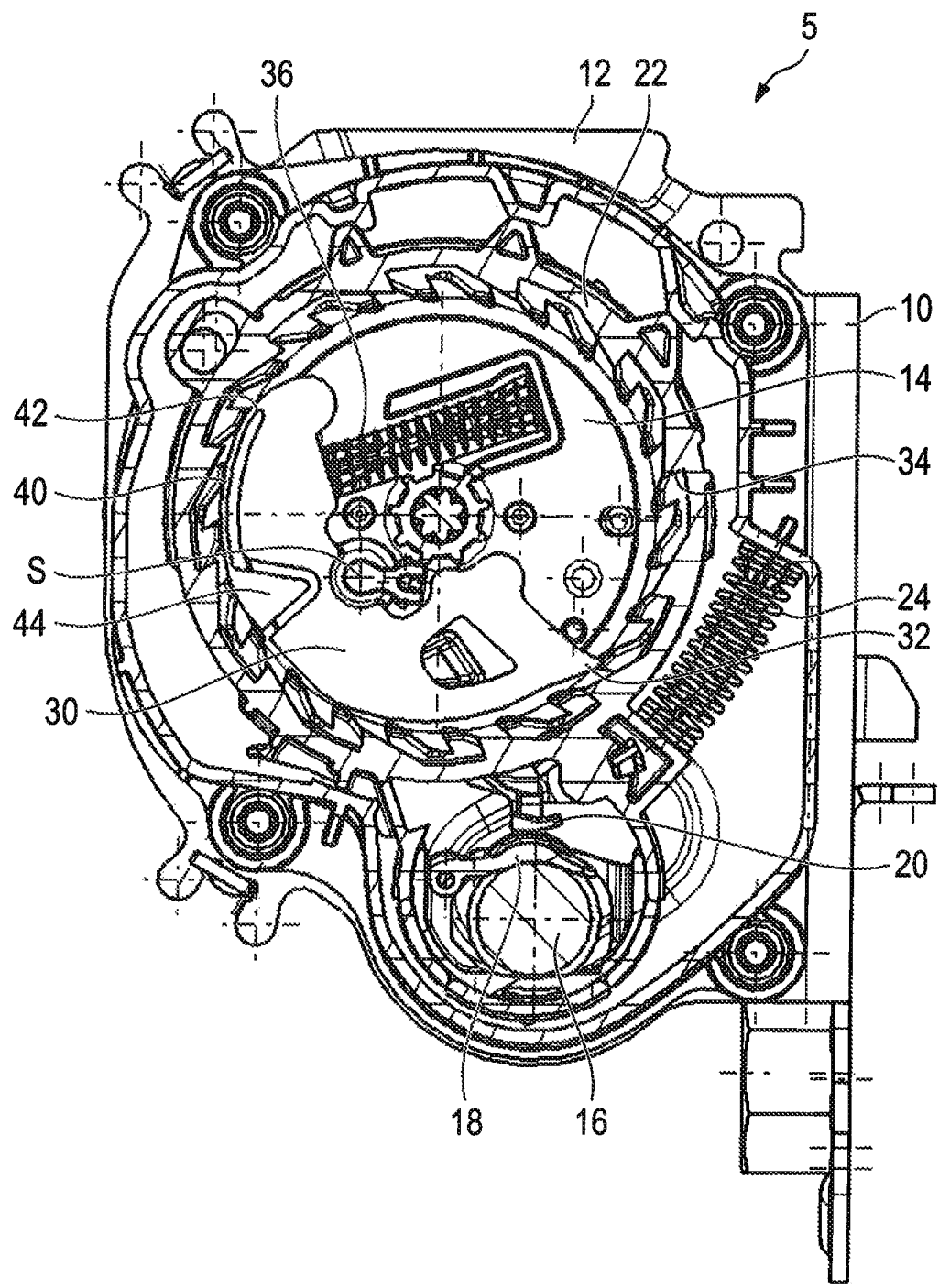
FIG. 3 shows, in a side view, a belt retractor according to a second embodiment of the invention.

FIG. 3 illustrates a second embodiment of a belt retractor according to the invention. For the components known from the preceding embodiment the same reference numerals are used and the foregoing explanations are referred to in this respect.

The substantial difference between the first and second embodiments consists in the fact that a pivoted lever 40 which is connected to the inertia pawl 30 at one end 42, namely at the end facing away from the inertia pawl tip 32, is provided in the second embodiment. At the other end of the pivoted lever 40 a leverage mass 44 is provided.

The pivoted lever 40 along with the leverage mass 44 is formed integrally with the remaining inertia pawl 30 here. The inertia pawl may be injection-molded together with the pivoted lever 40 and the leverage mass 44, for example.

The pivoted lever 40 is configured in the form of a spring and, unless any external forces are acting, maintains the leverage mass 44 at the position shown in FIG. 3. When the belt reel 14 is rotated, centrifugal forces are acting on the leverage mass 44 so that the leverage mass 44 is urged outwardly. Thus, the pivoted lever 40 contacts the locking teeth 34. Due to the continued relative rotation between the belt reel 14 and thus also the pivoted lever 40 relative to the locking teeth 34, at a particular time there will be the situation that the leverage mass 44 attempts to force the pivoted lever 40 outwardly while the latter bears against the tip of a tooth of the locking teeth 34. Herefrom it is resulting that the end 42 of the pivoted lever 40 opposed to the leverage mass 44 is pressed radially inwardly. This pressure is transmitted to the inertia pawl 30 which is thus moved, against the action of the return spring 36, from its home position shown in FIG. 3 to the locking position. In this way, the belt reel 14 is coupled to the locking ring 22.

In the same way as in the first embodiment, also in the second embodiment the rotational speed of the belt reel 14 results in a centrifugal force which ultimately produces a torque counteracting the action of the return spring 36. Thus, the webbing-sensitive locking can be substantially triggered by exceeding an angular acceleration of the belt reel and substantially by exceeding a limit speed of the belt reel or by a mixture of the rotational speed of the belt reel and the angular acceleration of the belt reel.

Figure 4:
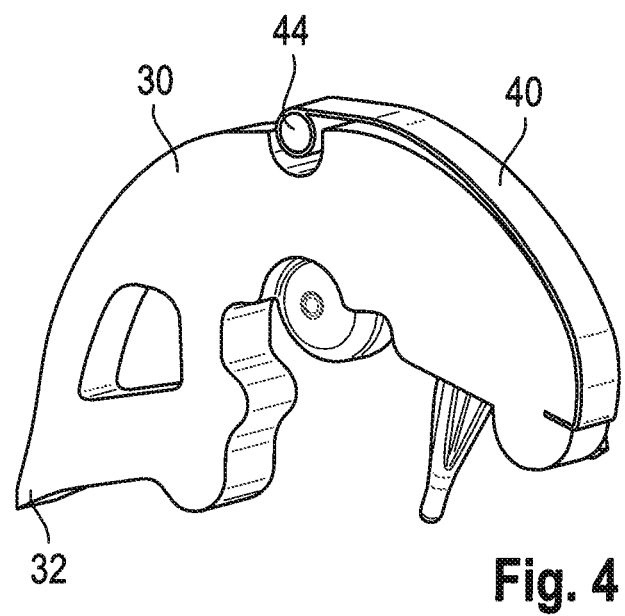
FIG. 4 shows, in a perspective view, an inertia pawl for a belt retractor according to a design variant of the second embodiment.

FIG. 4 illustrates a variant of the second embodiment. The difference from the embodiment according to FIG. 3 consists in the fact that in the variant according to FIG. 4 the pivoted lever 40 is not formed integrally with the inertia pawl 30 but is in the form of a separate component. The pivoted lever 40 is especially in the form of a leaf spring which is suspended in the inertia pawl 30 at the end thereof facing away from the inertia pawl tip 32 and at the opposite end supports the leverage mass 44.

Figure 5:
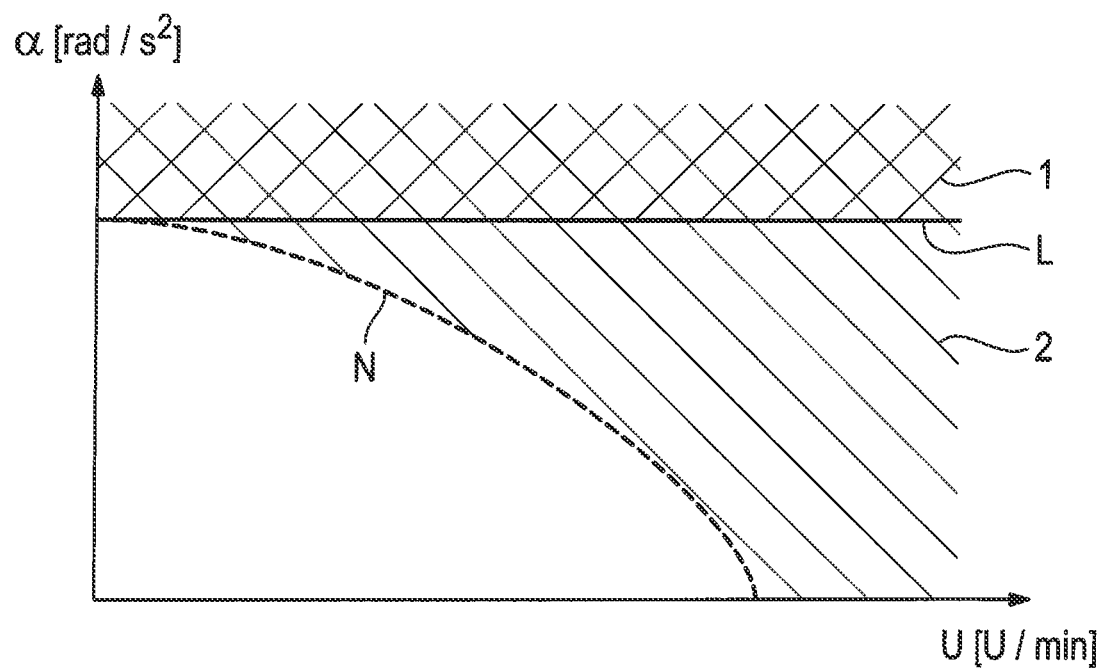
FIG. 5 shows a diagram illustrating different trigger conditions of the inertia pawl for belt retractors according to the invention.

In FIG. 5, the parameters for webbing-sensitive blocking of the belt reel 14 are schematically represented. The line L shows the triggering in a prior art belt retractor. It is solely the angular acceleration which decides whether the belt retractor is in the locked condition (area 1 hatched to the right) or is unlocked (area below the line L).

The line N shows the so-called locking limit for a belt retractor according to the invention as set forth in the first example embodiment. Above the line N (area 2 hatched to the left) the webbing-sensitive locking was triggered and below the line N the inertia pawl 30 was not activated.

In the left-hand area of the curve N webbing-sensitive blocking is triggered (almost) solely due to high angular acceleration of the belt reel. In this area the responsiveness of the webbing-sensitive blocking is comparable to that of a prior art belt retractor.

At the right-hand end of the curve N the webbing-sensitive blocking is triggered (almost) solely due to the high rotational speed of the belt reel 14; the angular acceleration is almost negligible in this case. This enables the maximum rotational speed of the belt reel occurring during operation to be limited by design, for example to a value within the order of magnitude of 2000 revolutions per minute.

In the area lying between the two ends of the curve N the webbing-sensitive blocking is triggered by superposition of the effect of the angular acceleration of the belt reel and the effect of the absolute rotational speed of the belt reel. The progression of the curve N can be adjusted by the size of the space A in the first embodiment and the spring rigidity of the pivoted lever 40 relative to the leverage mass 44.

In belt retractors according to the invention as set forth in the second embodiment, the leverage mass 44 moves outwardly depending on the rotational speed due to the centrifugal force. Upon reaching or, resp., exceeding a limit speed, the leverage mass 44 contacts the locking teeth 34 so that subsequently the inertia pawl (30) will be deflected.

The invention claimed is:

1. A belt retractor (5) for a vehicle seat belt system, comprising a frame (10), a belt reel (14) which is rotatably arranged in the frame (10) and a locking system which can lock the belt reel, the locking system including an inertia pawl (30) having a home position while rotating with the belt reel (14) and being pivotable relative to the belt reel (14) about a pivot axis (S) into a locking position, wherein a pivoted lever (40) is arranged on the outside of the inertia pawl (30) and is adapted to trigger pivoting of the inertia pawl (30) into contact with locking teeth (34) of the locking system in response to exceeding a predetermined centrifugal force on the locking pawl (30).

2. The belt retractor (5) according to claim 1, wherein the pivoted lever (40) is arranged by one end on the inertia pawl (30) and at the other end includes a leverage mass (44).

3. The belt retractor (5) according to claim 1, wherein the pivoted lever (40) is connected to the inertia pawl (30) at the end thereof facing away from an inertia pawl tip (32).

4. The belt retractor (5) according to claim 1, wherein the pivoted lever (40) is a leaf spring made from metal.

5. The belt retractor (5) according to claim 1, wherein the pivoted lever (40) is formed integrally with the inertia pawl (30).

* * * * *